United States Patent [19]

Gatzek

[11] 4,107,805
[45] Aug. 22, 1978

[54] RIVET MAKING METHOD AND RIVET

[76] Inventor: Leo E. Gatzek, 5825 Alcove, North Hollywood, Calif. 91607

[21] Appl. No.: 794,935

[22] Filed: May 9, 1977

[51] Int. Cl.² .............................................. B21K 1/58
[52] U.S. Cl. .................................................. 10/27 R
[58] Field of Search ............... 10/27 R, 27 E; 29/458, 29/509; 72/47; 85/37, 1 C

[56] References Cited

U.S. PATENT DOCUMENTS

| | | | |
|---|---|---|---|
| 980,420 | 1/1911 | Hulfish | 10/27 R |
| 1,717,388 | 6/1929 | Keeler | 10/27 R |
| 2,115,200 | 4/1938 | Von Forster | 10/27 R |
| 3,642,312 | 2/1972 | Dalton | 85/37 X |
| 3,911,783 | 10/1975 | Gapp et al. | 85/37 |

*Primary Examiner*—E. M. Combs
*Attorney, Agent, or Firm*—Allan M. Shapiro

[57] ABSTRACT

Rivet has a high strength body and a metallurgically bonded cladding that provides corrosion resistance. Clad wire is fed to rivet header which is dimensioned so that, when heading die strikes, hydro-dynamic flow of the cladding correctly distributes the cladding.

3 Claims, 5 Drawing Figures

RIVET MAKING METHOD AND RIVET

BACKGROUND OF THE INVENTION

1. Field of the Invention

This invention is directed to a rivet making method and the resultant rivet, and particularly a high-strength clad corrosion resistant rivet.

2. Prior and Related Art

One of the most troublesome and severe corrosion problems confronting the aircraft industry today is the exfoliation of aircraft structural skin material, especially high-strength aluminum alloy aluminum-coated sheets, starting at the fastener-receiving holes.

Metal cladding or painting of the exterior surfaces of the aircraft does not eliminate this difficulty. When the holes for the fasteners are drilled or punched in the structural members or plates, to receive the fasteners, the cladding no longer provides the desired protection for the end-grain of the high-strength base metal alloy which is then exposed in the walls of the fastener-receiving holes. Moisture seeps or is drawn into the fayed surfaces or between the fasteners and the walls of the holes and countersunk openings where the end-grain of the structural material or sheets was exposed by the drilling (or punching), for the reception of the fasteners.

With paint coatings, when applied to the skin surfaces, moisture penetration may be retarded or postponed to some degree but once the coating becomes aged it begins to crack or flake around the fastener heads. This allows the moisture direct access to the critical end grain areas in the walls of the holes around the fasteners. In either case, although painting has been preciously recommended, since it afforded some degree of temporary protection, moisture was found to eventually penetrate, and corrosion and exfoliation occurred.

Also fastener installation with a wet zinc chromate primer, or uncured fuel tank sealant has been used but this did not produce the desired results, particularly, it does not solve the problems of nonelectrical continuity and temperature variations.

The teachings of Dalton U.S. Pat. No. 3,642,312 do not properly overcome the corrosion problem. That patent teaches the making of a rivet of high-strength aluminum alloy and then apply a pure, soft aluminum coating to the exterior of the already made rivet. The patent teaches that this coating may be applied by mechanical cladding, such as jacketing and peening. It also suggests that flame spraying, vacuum deposition, molten dipping, electroplating and vapor or gas plating can be used. It tells us that any method may be of value so long as a relatively thick and soft coating of pure aluminum is applied so that the fastener insertion application technique will move or smear some of the coating from the exterior of the rivet onto and into the exposed end-grain of the base aluminum alloy material in the receiving opening surrounding and in contact with the rivet and smeared into position in the structural sheet member. However, this method of making the rivet is unsatisfactory in that such coating methods do not provide the proper anti-corrosion characteristics to the rivet itself. For this reason, a method of making the clad high-strength rivet and the resultant novel rivet is required.

SUMMARY OF THE INVENTION

In order to aid in the understanding of this invention, it can be stated in essentially summary form that it is directed to a rivet making method and rivet. The rivet making method comprises the steps of forming a wire having a high-strength core and a corrosion resistant metallurgically bonded cladding thereon and subsequently forming a rivet therefrom. The rivet is formed in that way.

It is thus an object of this invention to provide a rivet which has a high-strength core and a metallurgically-bonded coating so that the coating not only acts as an inhibitive barrier for the core of the rivet but also provides an effective and satisfactory metallic sealant between the rivet and the walls of the rivet hole. It is a further object to provide corrosion protection to the rivet body itself by providing a metallurgically clad anodic cladding material thus protecting the core material both physically and electrolitically against corrosion.

The features of the present invention which are believed to be novel are set forth with particularity in the appended claims. The present invention, both as to its organization and manner of operation, together with further objects and advantages thereof, may be understood best by reference to the following description taken in conjunction with the accompanying drawings.

DESCRIPTION OF THE PREFERRED EMBODIMENT

Figure 4:
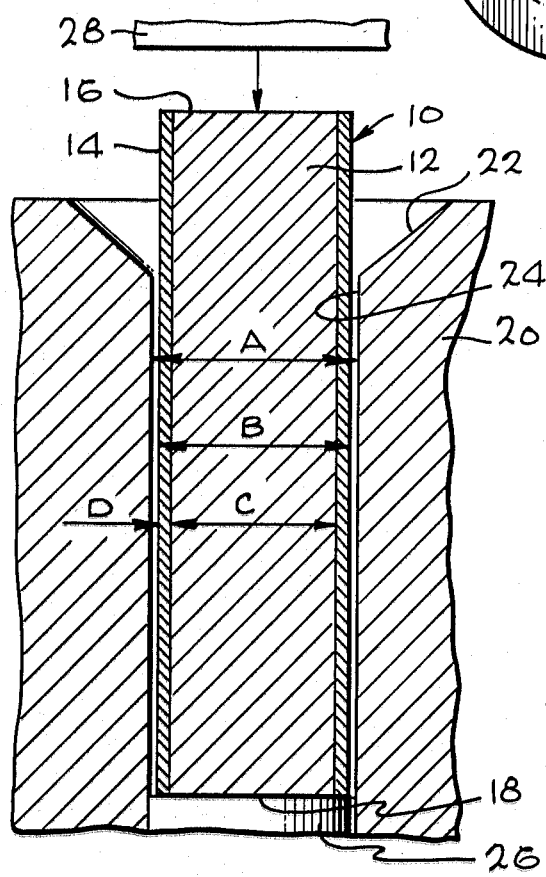
FIG. 4 is a longitudinal section through the length of rivet wire in a rivet header die just prior to heading.

Rivet wire or rod is cut to form a rivet blank 10. See FIG. 4. The rivet wire has high-strength core 12 carrying thereon clad 14 which is metallurgically-bonded thereon. The high-strength core can be any high-strength rivet material, but in the preferred embodiment is the high-strength aluminum alloy such as 7075-T4 :alloy as defined by the Aluminum Association Alloy Designation System. Cladding 14 forms a metallurgically-bonded coating, the composition of which is of high resistance to corrosion. The cladding material is anodic to the core alloy it covers thus protecting it physically and electrolitically against corrosion. The clad layer is usually more pure aluminum than the high-strength core. Rivet blank 10 is cut off from the wire so that it has head end 16 and plain end 18. In FIG. 4, the letter C indicates the diameter of the core wire of the rivet blank, while the letter D indicates the thickness of the cladding. The overall rivet wire diameter is shown by letter B.

Figure 5:
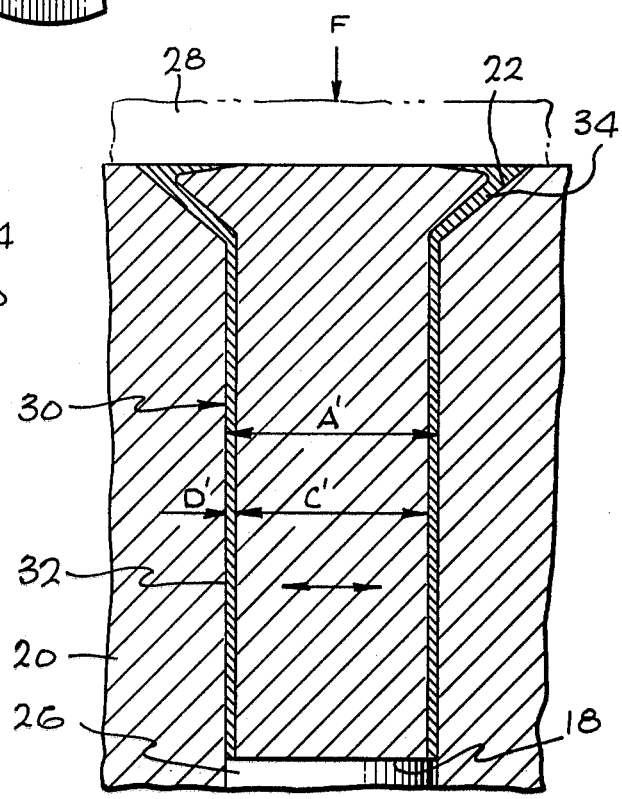
FIG. 5 is similar to FIG. 4, showing the structure immediately after heading.

Heading die 20 has a rivet bore indicated by letter A in FIGS. 4 and 5 and has countersink 22 which intersects the main body bore 24 through the heading die. It is this body bore 24 that has the diameter A. Stop 26 is positioned in the lower part of bore 24 to act as a stop during heading of the rivet blank and to serve as an ejector of the finished headed rivet. Header 28 is forcefully moved down to impact the headend 16 of the rivet blank for the heading thereof.

It is critical to this invention that the interior bore 24 in heading die 20, that is the diameter A, be larger than the outside diameter of the rivet blank, diameter B.

Figure 2:
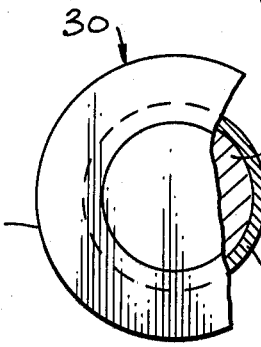
FIG. 2 is a top plan view thereof, with parts broken away and parts taken in section.

Dimension A must be larger than dimension B by about one-half mill (0.0005 inches). This initial spacing is necessary so that when the header punch descends, as shown in FIG. 2, there is both lateral and longitudinal cladding material flow. As illustrated in FIG. 5, dimension C' increases with respect to dimension C. Dimension D' decreases with respect to dimension D. The overall diameter of the headed rivet 30 is the same as dimension A. The headed rivet 30 now has shank 32 and head 34 due to the heading operation. In addition to the expansion of the rivet blank to fill the bore 24 and to form the shank 32, and in addition to the header punch spreading the material above the die to form head 34, there is also longitudinal flow of the relatively soft clad layer 14. As the heading punch strikes, there is hydrodynamic or plastic flow so that there is more clad volume on the head after the strike than there was on the corresponding length of the rivet blank before the strike. It is the clearance between the outside diameter of the rivet blank before the strike and the main bore A in the die, plus the fact that the cladding material has been metallurgically bonded to the core material rather than merely coated, that permits this plastic hydrodynamic flow of the cladding material and makes the clad material heavier at the head than if the hydrodynamic flow did not take place.

Figure 1:
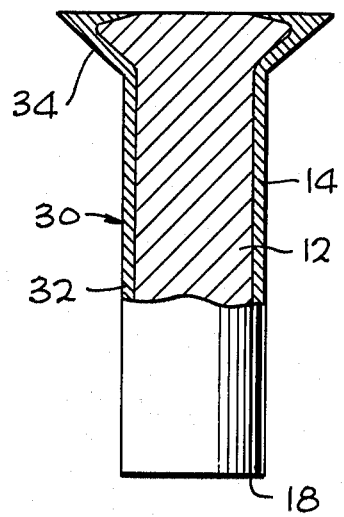
FIG. 1 is a longitudinal section through the rivet of this invention made in accordance with the rivet making method of this invention.
Figure 3:
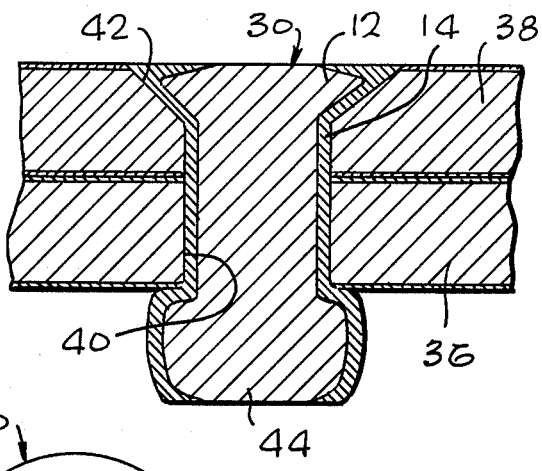
FIG. 3 is a longitudinal section through the rivet showing it installed and headed.

The result of this rivet making method and the rivet that results from it, is reduction in corrosion. FIG. 3 illustrates two skin layers 36 and 38 which overlap and each have a high-strength core with a corrosion resistant cladding thereon. As long as the cladding is uninterrupted, the core material is protected. The cladding layer has the most corrosion resistance while the unprotected edge of the main layer in the with-the-grain direction has lesser corrosion resistance. However, it is the ends of the layer in the cross-grain-direction where the end of the grain is exposed where the maximum corrosion occurs. FIG. 3 illustrates rivet hole 40 drilled through the layers 36 and 38. Rivet hole 40 has counter-sink 42 in layer 38 so that when rivet 30 is installed, its head 34 fits in countersink 42 to provide a smooth, flush surface. Preferrably, rivet 30 is a close fit in hole 30. When the rivet is installed and backed up, rivet 30 is upset at 44. The closeness of the fit of rivet 30 in rivet hole 40 plus the upsetting is enough to place the clad layer 14 in intimate contact with the entire bore of rivet hole 40 to protect the surfaces of the high-strength core material of the skin layers, particularly the end-grain thereof.

Furthermore, clad 14 extends up over the top of the rivet head a sufficient distance to that throughout the surface of the counter bore and particularly at the largest diameter thereof and the adjacent part of the head, the rivet cladding protects the high-strength material of the skin layer and joins with the cladding layer thereof. The relatively more malleable rivet cladding will be forced into the void in the sides of the fastener receiving holes around the circumference to effectively seal the exposed end-grains throughout the entire area of the rivet holes. Metallic sealing of the end-grain surfaces of the hole and the counter-sink area prevents ingress of moisture or sea water and significantly reduces the opportunity for the corrosion mechanisms and exfoliation to originate. Another major benefit is the improved fatigue life of the riveted metal-to-metal members by the reduction of corrosion.

This structure also eliminates the wet sealant rivet installation method with the resultant saving in installation costs and the providing of metal-to-metal fastening.

This invention having been described as preferred embodiment, it is clear that it is subject to numerous modifications and embodiments within the ability of those skilled in the art and without the exercise of inventive faculty. Accordingly, the scope of this invention is defined by the scope of the following claims.

What is claimed is:

1. The method of making a high-strength corrosion resistant rivet comprising the steps of:

forming a rivet blank having a high-strength core and having a metallurgically bonded uniformly thick exterior cladding layer of higher corrosion resistance than the core;

placing the rivet blank in a heading die which has a shank bore larger than the rivet blank by about 0.0005 inch; and forming the rivet blank into a rivet by striking the rivet blank with a header punch while the rivet blank is in the heading die to simultaneously expand the rivet blank into the bore of the die, from the head on the rivet and cause hydrodynamic flow of cladding material, part of such cladding material flowing out of the shank bore and around and onto the top of the head of the finished rivet so that there is more clad volume on the head after the strike than there was on the corresponding length of the rivet blank before the strike.

2. The method of claim 1 further including subsequent step of ejecting the rivet from the header die.

3. The method of claim 1 further including the subsequent step of inserting the rivet through a rivet hole extending through adjacent layers to be fastened together and then upsetting the rivet so that the cladding on the rivet is in intimate contact with all the surfaces in the rivet hole in the layers with which the rivet engages.

* * * * *